Nov. 3, 1942.                    H. G. VAUGHN                    2,300,440
                                  CONTAINER
                              Filed Feb. 15, 1939
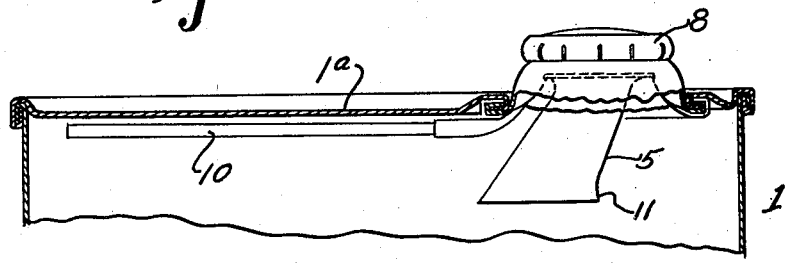
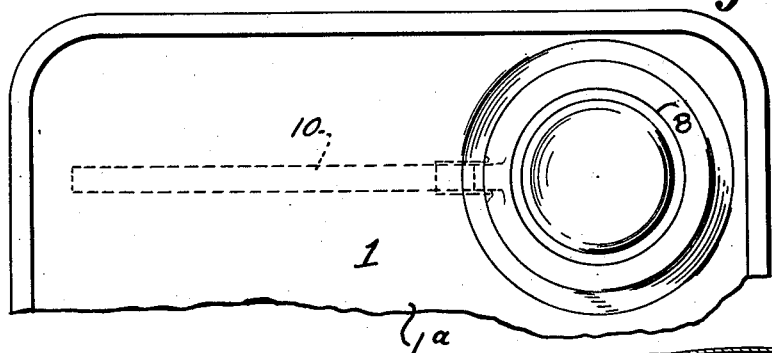
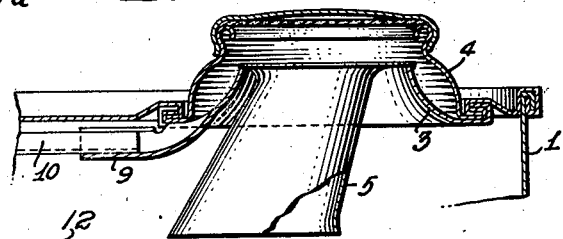
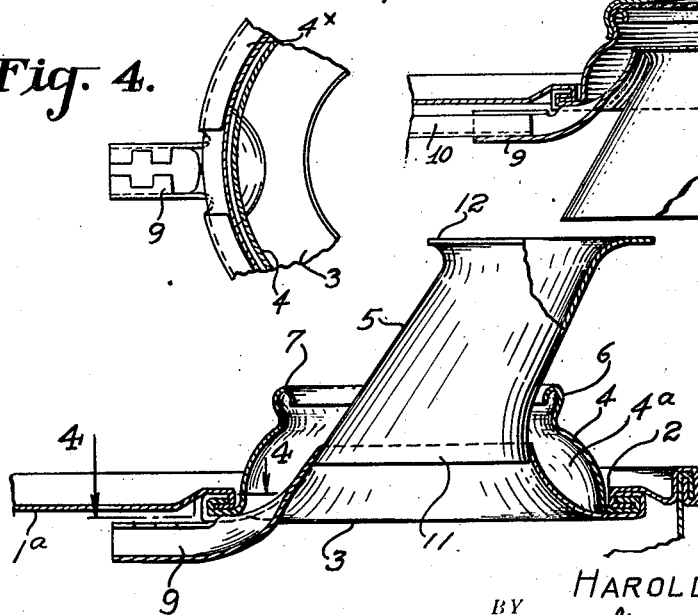
INVENTOR
HAROLD GAR VAUGHN
BY
ATTORNEY Patented Nov. 3, 1942

2,300,440

UNITED STATES PATENT OFFICE 2,300,440

CONTAINER

Harold Gar Vaughn, Warren, Ohio, assignor to The Ohio Corrugating Company, Warren, Ohio, a corporation of Ohio Application February 15, 1939, Serial No. 256,546

1 Claim. (Cl. 221—27)

This invention relates to a container having a sheet metal wall in which is mounted a combined closure, pouring and venting means.

One object of the invention is to provide an improved container having a pouring spout normally disposed within the container when the latter is closed, but movable to a pouring position and so mounted on the walls of the container opening that when in pouring position danger of drippings on the container is substantially eliminated.

Another object of the invention is to provide an improved container normally disposed within the container when the latter is closed and movable outwardly through the opening for pouring the container contents, the spout being supported by the walls of the container opening when in either position.

Another object of the invention is to provide an improved container having an opening and pouring spout normally disposed in the container and movable outwardly for pouring the container contents and to combine therewith a closure engaging wall and a vent.

A further object of the invention is to provide an improved container of simplified construction having an opening in one wall and a spout movably supported in the opening.

Other objects of the invention will be apparent to those skilled in the art to which my invention relates from the following description taken in connection with the accompanying drawing, wherein:

Fig. 1 is a fragmentary view, partly in side elevation and partly in section on the line 1—1 of Fig. 2, of a container embodying my invention.

Fig. 2 is a plan view of parts shown in Fig. 1.

Fig. 3 is a fragmentary section, enlarged, on the line 1—1 of Fig. 2, the spout being shown in normal position.

Fig. 4 is a fragmentary view on the line 4—4 of Fig. 5.

Fig. 5 is a view similar to Fig. 3, but showing the spout in pouring position.

In the drawing, 1 indicates as an entirety a container all the walls of which are preferably formed of sheet metal and connected in any desired manner. The container may be of any desired cross sectional shape, a non-circular form being shown for illustrative purpose. Adjacent one side of the container 1, its top wall 1a is formed with an opening 2 in which the peripheral portions of inner and outer annular members 3, 4, are rigidly and liquid tight mounted, such peripheral portions and the marginal portion of the opening 2 being preferably folded one within the other in a well known manner. The annular members 3, 4, are disposed in substantially concentric, spaced relation to form a chamber 4a around the inner member 3 and a spout 5 when the latter is in pouring position (see Fig. 5). The member 4 is preferably bell-shaped and its outer end portion is shaped to permit the application of a closure device capable of sealing the container. In the illustrated form of construction, this end portion is circumferentially expanded to form a surrounding shoulder 6 and curled inwardly and downwardly to form a seat 7 for a closure device 8. At one side, the peripheral portion of the inner member is embossed downwardly and extended substantially radially, the extended portion being bent into hollow form to form an elongated conduit 9 in communication at its inner end with the chamber 4a, and extending therefrom in close relation to the container wall 1a. The conduit 9 and chamber 4a serve as a vent to admit air to the upper portion of the container during pouring of its contents. If desired the outer end of the conduit 9 may have attached to it the inner end of a tube 10 which may extend laterally in close relation to the wall 1a any desired distance. The inner end of the tube 10 may be telescoped into the conduit 9 and frictionally or otherwise secured thereto.

The closure device 8 is shown as consisting of a metal cap the skirt portion of which is provided with tabs 8a adapted to engage the underside of the shoulder 6. The closure device 8 may be similar in construction to that shown in Letters Patent No. 2,121,843, dated June 28, 1938, and capable of removal and replacement from time to time.

In the form of construction shown in Figs. 1, 2, 3, 4 and 5, the inner portion of the inner member 3 is curved or flared upwardly, to form a horizontally disposed seat for a correspondingly flared end portion 11 on the inner end of the spout 5, the flared end 11 of the spout, when the latter is moved outwardly for pouring (see Fig. 5), being arranged to frictionally and in a substantially liquid tight manner engage its seat and thus support the spout in pouring position. The spout 5 is of general conical shape so as readily to slide or more through the member 3 from normal to pouring position and vice versa and its axis is disposed at an angle to the plane of its flared end 11 so that when the spout is moved to pouring position its outer or discharge end shall extend laterally beyond the outer member 4 and approximately to a position above the side of the container, whereby danger of drippings on the latter is substantially eliminated. The outer end of the spout 5 is provided with a flange 12 to form a pouring lip. The outside diameter of the flange 12 is somewhat larger than the seat or the terminating inner end of the member 3 so as to engage therewith and be supported thereon when the spout is moved to normal position (see Fig. 3). The outer end portion of the spout is shape to position the flange 12 parallel to the end 11, so that the spout may be moved outwardly and inwardly in a direction substantially axially thereof and when in normal position it is spaced from the member 3.

From the foregoing description it will be noted that the spout comprises a single unitary member and is normally disposed entirely within the container so that opening, closing and sealing and re-opening, re-closing and re-sealing thereof are effected independently of the spout, and when the container is opened, the spout is operable to a pouring position, with its outer or discharge end so disposed as to substantially eliminate danger of drippings on the container. At the same time, the arrangement provides for venting during pouring. Also, the spout may be moved to and from either position and supported in pouring position without contact with the closure engaging wall. Also, in my construction the vent chamber is formed by an outer member and an inner member, the latter serving to support the spout in either normal or pouring position, so that the number of parts required is reduced and manufacture and assembly are simplified.

It will also be noted that the spout is disposed at its outer end outwardly or laterally when in pouring position by inclining the conical walls of the spout at an angle to its inner or seat engaging end and arranging its seat on the inner member 3 horizontally or in a plane parallel to the top wall 1a.

It will also be observed that the inner end of the spout frictionally engages the seat provided therefor on the inner member, the resiliency of the metal permitting these parts to be secured together to support the spout in pouring position and to be disengaged by downward pressure on the spout.

The spout may be made in various ways, for example, from a section of sheet metal shaped into either form herein illustrated with its edges secured by suitable means (not shown) such as welding or seaming.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

A container having a horizontal sheet metal top wall formed with an opening, a unitary, rigid spout freely movable bodily endwise through said opening to and from pouring position and having outwardly flared inner and outer ends, inner and outer concentrically related annular members peripherally connected at their inner ends with the wall of said opening and in unobstructed communication with the interior of the container to permit endwise movement of said spout, said members being spaced to form a chamber around said inner member and said outer member extending upwardly beyond said inner member to form a closure seat parallel to said top wall and said inner member at one side being embossed downwardly and provided with an extension forming a venting conduit leading from the interior of the container to said chamber, the inner end of said inner member terminating in a plane parallel to said top wall and being flared outwardly to form a seat with which the flared inner end of said spout frictionally engages to support the latter in pouring position, the inner flared end of said spout being disposed at an angle to its longitudinal axis, whereby the outer end of said spout, when the latter is in pouring position, extends laterally relative to said opening and the outer flared end of said spout being arranged to engage the outer end of said inner member when said spout is moved inwardly to support it in non-pouring position.

HAROLD GAR VAUGHN.